United States Patent
Leblanc et al.

(10) Patent No.: US 8,843,597 B2
(45) Date of Patent: Sep. 23, 2014

(54) METHOD FOR ENABLING BANDWIDTH MANAGEMENT FOR MOBILE CONTENT DELIVERY

(75) Inventors: Michael Leblanc, Fredericton (CA); Jody Glidden, Miami Beach, FL (US); David James Hudson, Fredericton (CA); Ian Brian Delong, Fredericton (CA); Martyn Edward Sibbald, Fredericton (CA); Howard Frith Powell, Fredericton (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/409,338

(22) Filed: Mar. 1, 2012

(65) Prior Publication Data

US 2012/0158918 A1 Jun. 21, 2012

Related U.S. Application Data

(63) Continuation of application No. 12/435,301, filed on May 4, 2009, now Pat. No. 8,156,204.

(60) Provisional application No. 61/051,071, filed on May 7, 2008, provisional application No. 61/051,079, filed on May 7, 2008, provisional application No. 61/058,221, filed on Jun. 3, 2008.

(51) Int. Cl.
*G06F 15/16* (2006.01)
*H04L 12/911* (2013.01)
*H04L 29/08* (2006.01)
*H04L 12/54* (2013.01)

(52) U.S. Cl.
CPC .......... *H04L 12/5695* (2013.01); *H04L 47/824* (2013.01); *H04L 47/828* (2013.01); *H04L 67/26* (2013.01); *H04L 47/822* (2013.01)

USPC ............ 709/219; 709/224; 709/246; 370/468

(58) Field of Classification Search
USPC ........................... 709/219, 224, 246; 370/468
See application file for complete search history.

(56) References Cited

U.S. PATENT DOCUMENTS 6,785,228 B1 8/2004 Vandette et al.
6,886,029 B1 4/2005 Pecus et al.
(Continued)

FOREIGN PATENT DOCUMENTS

EP 1523154 4/2005
WO WO01/78320 10/2001
(Continued)

OTHER PUBLICATIONS

Canadian Intellectual Property Office, "International Search Report" for corresponding International Patent Application No. PCT/CA2009/000614, dated Aug. 26, 2009, Canada.
(Continued)

*Primary Examiner* — Tesfay Yohannes
(74) *Attorney, Agent, or Firm* — Norton Rose Fulbright Canada LLP

(57) ABSTRACT

A system, method and device are disclosed for managing bandwidth in content delivery from a push content server to a wireless device. The system may include: a content server configurable to deliver content to the wireless device; a processor for controlling operation of the server; a communications subsystem coupled to the processor; a memory coupled to the processor; and a storage device coupled to the processor. The content server may include a module for managing bandwidth in content delivery from the content server to the wireless device, the module being configured to cause the content server to: record a policy for the delivery of content to the wireless device; initiate content delivery to the wireless device; evaluate the policy to determine whether new content for delivery is deliverable to the wireless device; deliver content when the policy is satisfied; and decline delivery of content when the policy is not satisfied.

17 Claims, 5 Drawing Sheets

(56) References Cited

U.S. PATENT DOCUMENTS

| | | |
|---|---|---|
| 6,957,071 B1 | 10/2005 | Holur et al. |
| 7,035,634 B2 | 4/2006 | Mead et al. |
| 7,069,014 B1 * | 6/2006 | Thenthiruperai et al. . 455/452.2 |
| 7,107,342 B1 | 9/2006 | Holur et al. |
| 7,111,058 B1 * | 9/2006 | Nguyen et al. ............... 709/224 |
| 7,373,416 B2 | 5/2008 | Kagan et al. |
| 7,783,752 B2 | 8/2010 | Parikh et al. |
| 7,974,258 B2 * | 7/2011 | Holt .............................. 370/344 |
| 8,156,204 B2 * | 4/2012 | Leblanc et al. .............. 709/219 |
| 2002/0194251 A1 * | 12/2002 | Richter et al. ............... 709/105 |
| 2003/0028688 A1 | 2/2003 | Tiphane et al. |
| 2004/0177247 A1 | 9/2004 | Peles |
| 2005/0075067 A1 | 4/2005 | Lawson et al. |
| 2005/0091693 A1 | 4/2005 | Amine et al. |
| 2006/0256130 A1 | 11/2006 | Gonzalez |
| 2006/0294244 A1 | 12/2006 | Naqvi et al. |
| 2007/0088852 A1 * | 4/2007 | Levkovitz .................... 709/246 |
| 2007/0260674 A1 | 11/2007 | Shenfield |
| 2008/0215748 A1 | 9/2008 | Kagan et al. |
| 2008/0228938 A1 * | 9/2008 | Plamondon .................. 709/233 |
| 2008/0270579 A1 * | 10/2008 | Herz et al. .................... 709/219 |
| 2009/0129405 A1 * | 5/2009 | Lauwers et al. ............. 370/468 |
| 2009/0135919 A1 | 5/2009 | Vered et al. |
| 2009/0165067 A1 * | 6/2009 | Bruckman et al. ............ 725/110 |
| 2009/0300673 A1 | 12/2009 | Bachet et al. |
| 2010/0086020 A1 * | 4/2010 | Schlack ................... 375/240.01 |
| 2010/0115565 A1 | 5/2010 | Fujihira et al. |
| 2010/0128664 A1 | 5/2010 | Denny et al. |
| 2010/0198943 A1 | 8/2010 | Harrang et al. |
| 2010/0223096 A1 * | 9/2010 | Bosan et al. ..................... 705/10 |
| 2011/0231212 A1 * | 9/2011 | Hurley et al. ..................... 705/5 |
| 2011/0231213 A1 * | 9/2011 | Anderson et al. ............ 705/7.11 |

FOREIGN PATENT DOCUMENTS

| | | |
|---|---|---|
| WO | WO03/041359 | 5/2003 |
| WO | WO03/098464 | 11/2003 |
| WO | WO2004/097564 | 11/2004 |

OTHER PUBLICATIONS

European Patent Office, Supplementary European Search Report dated Mar. 7, 2013, issued on European Patent Application No. 09741619.2.

European Patent Office, Communication Under Rule 71(3) EPC, Intention to Grant, dated Apr. 15, 2014, issued in European Patent Application No. 09 741 619.2-1862.

* cited by examiner

METHOD FOR ENABLING BANDWIDTH MANAGEMENT FOR MOBILE CONTENT DELIVERY

RELATED APPLICATIONS

This application claims priority from U.S. (Provisional) Application Nos. 61/051,071 (filed May 7, 2008), 61/051,079 (filed May 7, 2008) and 61/058,221 (filed Jun. 3, 2008) respectively entitled Method for Enabling Bandwidth Management for Mobile Content Delivery, Method for Enabling the Customization of Ringtones Determined by the Type and Category of Content Received, and Method for Disabling a Mobile Content Player While a Mobile Device is in Motion. All of which are herein incorporated by reference. This application is a continuation of U.S. patent application Ser. No. 12/435,301, the entirety of which is hereby incorporated by reference.

The disclosed method and system may operate in conjunction with the inventions described in pending U.S. provisional patent application Ser. Nos. 60/927,738, 60/008819, 61/066058, respectively entitled Method and System for Pushing Content to Mobile Devices, Method and System for the Delivery of Large Content Assets to a Smartphone Over a Mobile Network and Method and System fear Pushing Content to a Mobile Device Without a Push Capable Environment, which are all incorporated herein by reference.

FIELD OF THE INVENTION

This method and system relates to the field of delivery of content such as graphics, audio and video to mobile devices for a mobile learning content player and the management of the bandwidth usage.

BACKGROUND OF THE INVENTION

Currently a mobile learning content player may transfer content from a content server via, either a push or pull model. The content may be transferred when the content delivery is initiated.

The current model for mobile content delivery may be limited in that it is not within the discretion of the content provider or mobile device user to control a preferred mode of transmission, including wireless fidelity (WiFi) source and/or tethered solutions. For example, there is currently no consideration given for monthly bandwidth traffic or a manner in which to limit or modify content usage from these sources. Similarly, there is presently no consideration given for data usage when the user is roaming.

Some of the resulting limitations are that users might exceed the contractual data limits that are established with their wireless carriers and be forced to pay premium prices for the excess bandwidth usage. Similarly, content server administrators and/or users cannot limit or modify the manner in which content is able to be received.

The foregoing examples of the related art and limitations thereto are intended to be illustrative and not exclusive. Other limitations of the related art will become apparent to those of skill in the art upon a reading of the specification and a study of the figures.

BRIEF DESCRIPTION OF THE FIGURES

The present invention will be further understood from the following detailed description of embodiments of the invention, with reference to the drawings in which.

DETAILED DESCRIPTION OF THE INVENTION

Figure 1:
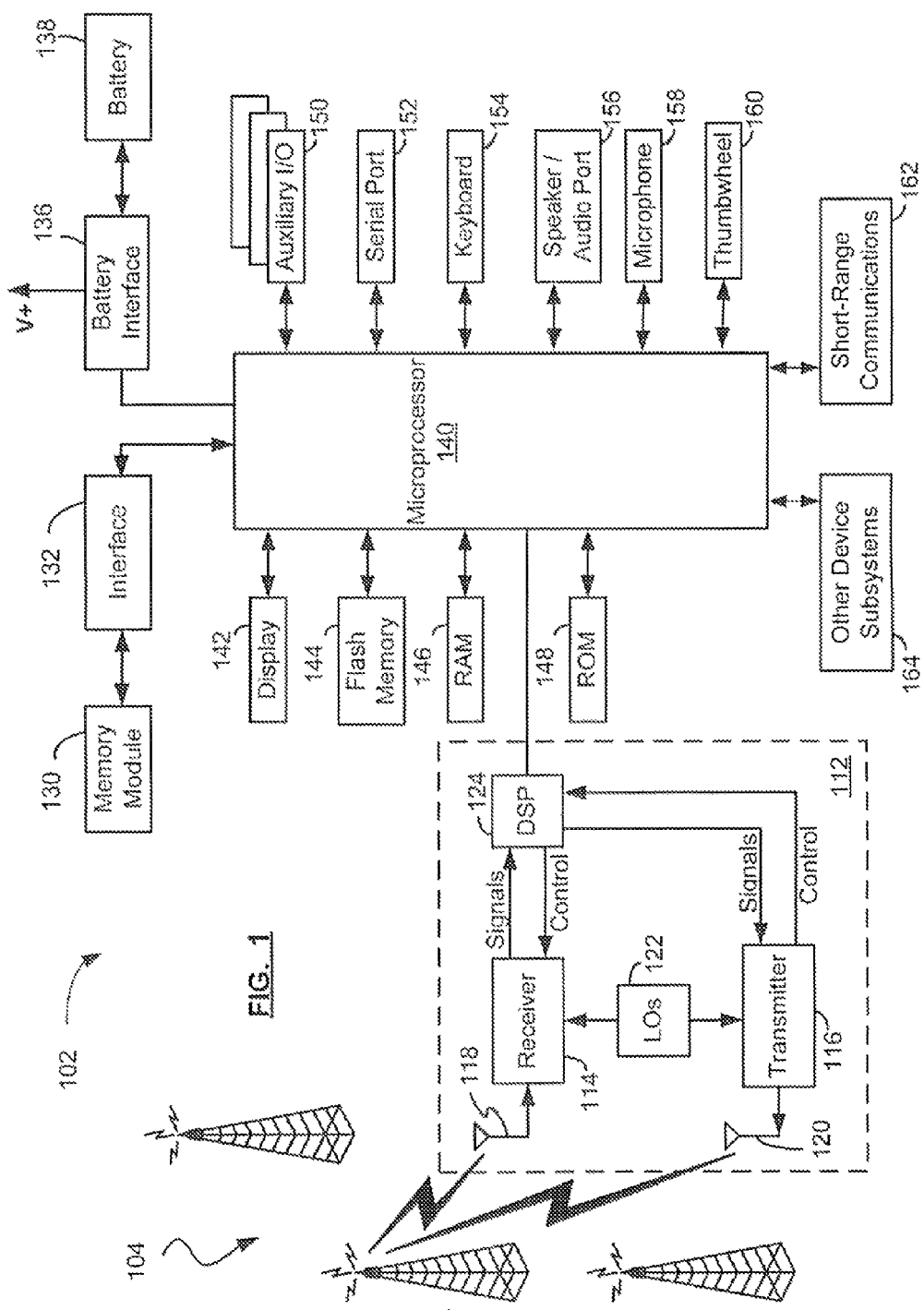
FIG. 1 shows in block diagram form a wireless device suitable for having a mobile content player in accordance with an embodiment.

In accordance with a broad aspect of the present invention(s) here is provided a Method for Enabling Bandwidth Management for Mobile Content Delivery having: a content server configurable to deliver push content to the wireless device; a processor for controlling operation of the server; a communications subsystem coupled to the processor for communicating with a communications network; a memory coupled to the processor; and a storage device coupled to the processor. The content server may include one or more modules for managing bandwidth in content delivery from the content server to the wireless device, and the one or more modules may be configured to cause the content server to: record a policy for the delivery of content to the wireless device; initiate content delivery to the wireless device; evaluate the policy to determine whether new content for delivery is deliverable to the wireless device; deliver content when the policy is satisfied; and decline delivery of content when the policy is not satisfied.

According to another broad aspect, the policy is recorded to permit delivery of content via a high cost connection when bandwidth usage is within a predetermined bandwidth range over a predetermined period of time, and the policy is recorded to decline delivery of content via a high cost connection when bandwidth usage is outside of a predetermined bandwidth range over a predetermined period of time. The content may be delivered to the wireless device via at least one of a non-carrier communication mode and tethered mode of transmission when bandwidth usage is outside of the predetermined bandwidth range.

According to another aspect, the content includes media files that have a relatively high transmission cost. The policy may also be set for a group of users sharing pooled bandwidth, and the one or more modules cause the server to evaluate whether additional bandwidth is available from the pool when the policy has been exceeded, calculate a new maximum bandwidth allotment using a formula based on the size of the remaining content, and communicate the new allotment to the wireless device.

In an embodiment, the policy may be based on at least one of: bandwidth available, bandwidth cost, type of content to be transmitted, size of the content to be transmitted and mode of transmission to the wireless device, and the mode of transmission is at least one of: carrier, non-carrier, physically tethered and roaming.

In a further broad aspect, there may be provided a method for managing bandwidth in content delivery from a push content server to a wireless device may include: recording a policy, on at least one of the content server and the wireless device, for delivery of content to the wireless device; initiating content delivery to the wireless device; evaluating the policy to determine whether new content for delivery is deliverable to the wireless device; delivering content to the wireless device when the policy is satisfied; and declining delivery of content when the policy is not satisfied.

In a further aspect, the policy may be recorded to permit delivery of content via a high cost connection when bandwidth usage is within a predetermined bandwidth range over a predetermined period of time, and the policy is recorded to decline delivery of content via a high cost connection when bandwidth usage is outside of a predetermined bandwidth range over a predetermined period of time; the content is delivered to the wireless device via at least one of a non-carrier communication mode and tethered mode of transmission when bandwidth usage is outside of the predetermined bandwidth range; declining is performed by one of the server and the wireless device; and the method further comprises physically connecting the wireless device to a networked content source when the tethered mode of transmission is used.

According to another aspect, content is pushed to the wireless device without user intervention, and the content includes media files that have a relatively high transmission cost.

In an embodiment, the policy is set for a group of users sharing pooled bandwidth, and further comprising evaluating whether additional bandwidth is available from the pool when the policy has been exceeded, calculating a new maximum bandwidth allotment using a formula based on the size of the remaining content, and communicating the new allotment to the wireless device.

According to a further aspect, the policy is based on at least one of: bandwidth available, bandwidth cost, type of content to be transmitted, size of the content to be transmitted and mode of transmission to the wireless device, and the mode of transmission is at least one of: carrier, non-carrier, physically tethered and roaming.

The policy may be recorded to permit delivery of content via a high cost connection when the content has a size within a predetermined range, and the policy is set to decline delivery of content via a high cost connection when the content size is outside a predetermined range.

The policy may limit delivery based on at least one of the type of content and the source of the content.

According to a further aspect, the method may include providing a notification on a display of the user device about the status of content delivery, and notifying the server when content delivery is declined.

According to a further aspect, the method may include queuing the content for later delivery after content delivery is declined, and performing at least one of removing, transferring and deleting the content from the queue when the wireless device is connected via a low cost connection.

The method may include reducing the rate of delivery of content before declining delivery of content.

According to a further broad aspect, there may be provided wireless device for managing bandwidth in content delivery from a push content server to the wireless device including: a processor for controlling operation of the wireless device; a first input device coupled to the processor for accepting an input; at least one display device coupled to the processor for communicating an output to the user; a communications subsystem coupled to the processor for communicating with a communications network, the communications network including a at least one content server configurable for delivering push content to the wireless device; a memory coupled to the processor; and a storage device coupled to the processor; and the wireless device may include one or more modules for managing bandwidth in content delivery from a push content server to the wireless device, the one or more modules being configured to cause the wireless device to: record a policy for the delivery of content to the wireless device; initiate content delivery to the wireless device; evaluating the policy to determine whether new content for delivery is deliverable to the wireless device; accepting delivery of content when the policy is satisfied; and declining delivery of content when the policy is not satisfied.

According to a further broad aspect, the policy is recorded to permit delivery of content via a high cost connection when bandwidth usage is within a predetermined bandwidth range over a predetermined period of time, and the policy is recorded to decline delivery of content via a high cost connection when bandwidth usage is outside of a predetermined bandwidth range over a predetermined period of time; the content is delivered to the wireless device via at least one of a non-carrier communication mode and tethered mode of transmission when bandwidth usage is outside of the predetermined bandwidth range; and the wireless device is physically connected to a networked content source when the tethered mode of transmission is used.

Further, the device may be configured to receive push content without user intervention, and the content includes media files that have a relatively high transmission cost.

Additionally, the policy may be set for a group of users sharing pooled bandwidth, and the one or more modules cause the wireless device to evaluate whether additional bandwidth is available from the pool when the policy has been exceeded, calculate a new maximum bandwidth allotment using a formula based on the size of the remaining content, and communicate the new allotment to the server.

The policy may also be based on at least one of: bandwidth available, bandwidth cost, type of content to be transmitted, size of the content to be transmitted and mode of transmission to the wireless device, and the mode of transmission is at least one of carrier, non-carrier, physically tethered and roaming.

Other and further advantages and features of the invention will be apparent to those skilled in the art from the following detailed description of embodiments thereof, taken in conjunction with the accompanying drawings.

One aspect of the present disclosure provides a method and apparatus to enable the management of content transmitted to a wireless handheld device. Such method and apparatus are particularly useful when relatively large files are transferred. Large files, such as media files which may include video and/or audio content, generally require greater bandwidth than data based transmissions such as email or voice transmissions. This generally greater demand on bandwidth may incur a greater transmission cost and/or overhead cost. Some service providers may also limit or prohibit transmission of content once a certain volume of data has been transmitted in a given period. The described method and apparatus may be used in conjunction with content sources, such as corporate servers, to effectively transmit content to wireless devices, either wirelessly and/or via a wired connection. The subject method may be employed by a server and administered by a content administrator without user intervention or input, in order to effectively push rich media files to mobile devices.

It should be noted that reduction in "cost" is used herein to mean the improvement, avoidance or reduction in a sacrifice, loss, penalty, or other undesirable factor. Reduction in cost may be an improvement in what must be performed, given, done or undergone to obtain something. "Cost" is not limited to financial cost, but may include the reduction of other costs such as performance or transmission overhead.

In the description, similar references are used in different figures to denote similar components. The term "push" is used herein to refer to a method of content delivery to a wireless device that is automatically delivered by a content server without any action being required on the part of the wireless device user or any polling of the server needed by the wireless device.

The term "pull" is used herein to refer to a method of content delivery to a wireless device that is initiated by the wireless device requesting the content from a content server with or without any action being required on the part of the wireless device user.

The term "pooling of bandwidth" is used herein to refer to a feature provided by some wireless carriers of allowing an organization to gather together the contractual bandwidth allotment for their users into a common total from which each user's consumption may be deducted to maximize the use of the bandwidth available to the organization.

The following description begins with a general description of a wireless device and communication system that may be used in conjunction with the method described herein. Further aspects of the method and related apparatus are then described.

FIG. 1 shows a block diagram illustrating a portable wireless device 102 that is suitable for including a mobile content player in accordance with an aspect of the present disclosure. The terms mobile and wireless device are used interchangeably herein.

The wireless or mobile device may including cellular telephones, mobile phones, smartphones, wireless laptop computers, a Blackberry™ device, personal digital assistants (PDAs), and pagers. These terms may be used interchangeably herein, and are so used without limiting the scope of the disclosure.

The wireless device 102 may communicate via a wireless communication network 104. The wireless network 104 may include one or more antennas, base stations, and supporting radio equipment for supporting wireless communications between wireless device 102 and other devices connected to wireless network 104. The wireless network 104 may be coupled to a wireless network gateway and to a wide area network, shown in FIG. 2.

In an embodiment, the wireless device or mobile device 102 may be a two-way communication device having at least voice and/or data communication capabilities, including the capability to communicate with other computer systems over a communication network. In an embodiment, the wireless device 102 may be a handheld device. Depending on the functionality provided by the wireless device 102, it may be referred to as a device including a data messaging device, a two-way pager, a cellular telephone with data messaging capabilities, a wireless Internet appliance, a data communication device (with or without telephony capabilities), a portable media or music player. The wireless device 102 may communicate with any one of a plurality of transceiver stations.

The wireless device 102 may incorporate a communication subsystem 112, which includes a receiver 114, a transmitter 116, and associated components, such as one or more antenna elements 118 and 120, local oscillators (LOs) 122, and a processing module such as a digital signal processor (DSP) 124, in an embodiment, the antenna elements 118 and 120 may be embedded or internal to the wireless device 102. The particular design of the communication subsystem 112 depends on the wireless network 104 in which the wireless device 102 is intended to operate.

The wireless device 102 may send and receive communication signals over the wireless network 104 after the required network registration or activation procedures have been completed. Signals received by the antenna 118 through the wireless network 104 are input to the receiver 114, which may perform such common receiver functions as signal amplification, frequency down conversion, filtering, and channel selection, as well as analog-to-digital (A/D) conversion. A/D conversion of a received signal allows more complex communication functions such as demodulation and decoding to be performed in the DSP 124. In a similar manner, signals to be transmitted are processed, including modulation and encoding, for example, by the DSP 124. These DSP-processed signals are input to the transmitter 116 for digital-to-analog (D/A) conversion, frequency up conversion, filtering, amplification, and transmission to the wireless network 104 via the antenna 120. The DSP 124 not only processes communication signals, but also provides for receiver and transmitter control. For example, the gains applied to communication signals in the receiver 114 and the transmitter 116 may be adaptively controlled through automatic gain control algorithms implemented in the DSP 124.

Network access is associated with a subscriber or user of the wireless device 102 via a memory module, such as a memory module 130, which may be a Subscriber Identity Module (SIM) card for use in a GSM network or a USIM card for use in a UMTS. The SIM card is inserted in or otherwise connected to an interface 132 of the wireless device 102 in order to operate in conjunction with the wireless network 104. Alternatively, the wireless device 102 may have an integrated identity module for use with systems such as Code Division Multiple Access (CDMA) systems.

The wireless device 102 also includes an interface 136 for receiving power including one or more batteries such as rechargeable batteries 138. The battery 138 provides electrical power to at least some of the electrical circuitry in the wireless device 102, and the battery interface 136 provides a mechanical and electrical connection for the battery 138. The battery interface 136 is coupled to a regulator (not shown) which provides power V+ to the circuitry of the wireless device 102.

The wireless device 102 includes a microprocessor 140 which controls the overall operation of the wireless device 102. Communication functions, including at least data and voice communications, are performed through the communication subsystem 112. The microprocessor 140 also interacts with additional device subsystems such as a display 142, a flash memory 144, a random access memory (RAM) 146, a read-only memory (ROM) 148, auxiliary input/output (I/O) subsystems 150, a Universal Serial Bus (USB) port 152, a keyboard or keypad 154, a speaker or audio port 156 for connecting to, for example a set of headphones, a microphone 158, input device such as a clickable thumbwheel, trackball, thumbwheel, or set of scroll buttons 160, a short-range communications subsystem 162, and any other device subsystems generally designated as 164. Some of the subsystems shown in FIG. 1 perform communication-related functions, whereas other subsystems may provide "resident" or on-device functions. Notably, some subsystems, such as the keypad 154, the display 142, and the clickable thumbwheel or trackball 160, for example, may be used for both communication-related functions, such as entering a text message for transmission over the wireless network 104, and executing device-resident functions such as a calculator or task list. Operating system software used by the microprocessor 140 is preferably stored in a persistent store such as the flash memory 144, which may alternatively be the ROM 148 or similar storage element. The operating system, specific device applications, or parts thereof, may be temporarily loaded into a volatile store such as the RAM 146.

The microprocessor 140, in addition to its operating system functions, enables execution of software applications on the wireless device 102. A predetermined set of applications that control basic device operations, including data and voice communication applications, will normally be installed on the wireless device 102 during or after manufacture. The wireless device 102 may include a personal information manager (PIM) application having the ability to organize and manage data items relating to a user such as, but not limited to, instant messaging, email, calendar events, voice mails, appointments, and task items, One or more memory stores may be available on the wireless device 102 to facilitate storage of information, such as the flash memory 144, the RAM 146, the ROM 148, the memory module 130, or other types of memory storage devices or FLASH memory cards represented by the other device subsystems 164, such as Secure Digital (SD) cards, mini SD cards, and micro SD cards.

The PIM and/or media applications have the ability to send and receive data items with other systems, for example, via either the wireless network 104 or a link to a computer system. The link to the computer system may be via the serial port 152 or the short-range communications subsystem 162. Additional applications may also be loaded onto the wireless device 102 through the wireless network 104, the auxiliary I/o subsystem 150, the serial port 152, the short-range communications subsystem 162, or any other suitable subsystem 164, and installed by a user in the RAM 146 or a non-volatile store such as the ROM 148 for execution by the microprocessor 140. Such flexibility in application installation may increase the functionality of the wireless device 102 and may provide enhanced on-device functions, communication-related functions, or both. For example, secure communication applications may enable electronic commerce functions and other such financial transactions to be performed using the wireless device 102.

In a data communication mode, a received data signal representing information such as a text message, an email message, a media file to be transferred, or Web page download will be processed by the communication subsystem 112 and input to the microprocessor 140. The microprocessor 140 will further process the signal for output to the display 142 or alternatively to the auxiliary I/o device 150. A user of the wireless device 102 may also compose data items, such as email messages, for example, using an input device such as the keypad 154 and/or the clickable thumbwheel or trackball 160 in conjunction with the display 142 and possibly the auxiliary I/O device 150, The keypad 154 may be any suitable input device including a complete alphanumeric keypad or a partial keypad such as telephone-type keypad.

For voice communications, the overall operation of the wireless device 102 is similar, except that the received signals may be output to the speaker or audio port 156 and signals for transmission may be generated by a transducer such as the microphone 158. Alternative voice or audio I/O subsystems, such as a voice message recording subsystem, may also be implemented on the wireless device 102. Although voice or audio signal output is typically accomplished primarily through the speaker or audio port 156, the display 142 may also be used to provide an indication of the identity of a calling party, duration of a voice call, or other voice call related information. Headphones, external speaker or other sound producing device may be used in place of the speaker 156.

The serial port 152 may be employed in a personal digital assistant (PDA) type communication device for which synchronization with a user's alternative data source, such as a computer is a desirable. The serial port 152 enables a user to set preferences through an external device or software application and extends the capabilities of the wireless device 102 by providing for information, media file, or software communication, including downloads to or uploads from the wireless device 102 other than through the wireless network 104.

The short-range communications subsystem 162 is an additional optional component which provides for communication between the wireless device 102 and different systems or devices, which need not necessarily be similar devices. For example, the subsystem 162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another embodiment, the short-range communications subsystem 162 may be a wireless networking communications subsystem, conforming to IEEE 802.11 standards such as 802.11b, 802.11g, and/or 802.11n.

Figure 2:
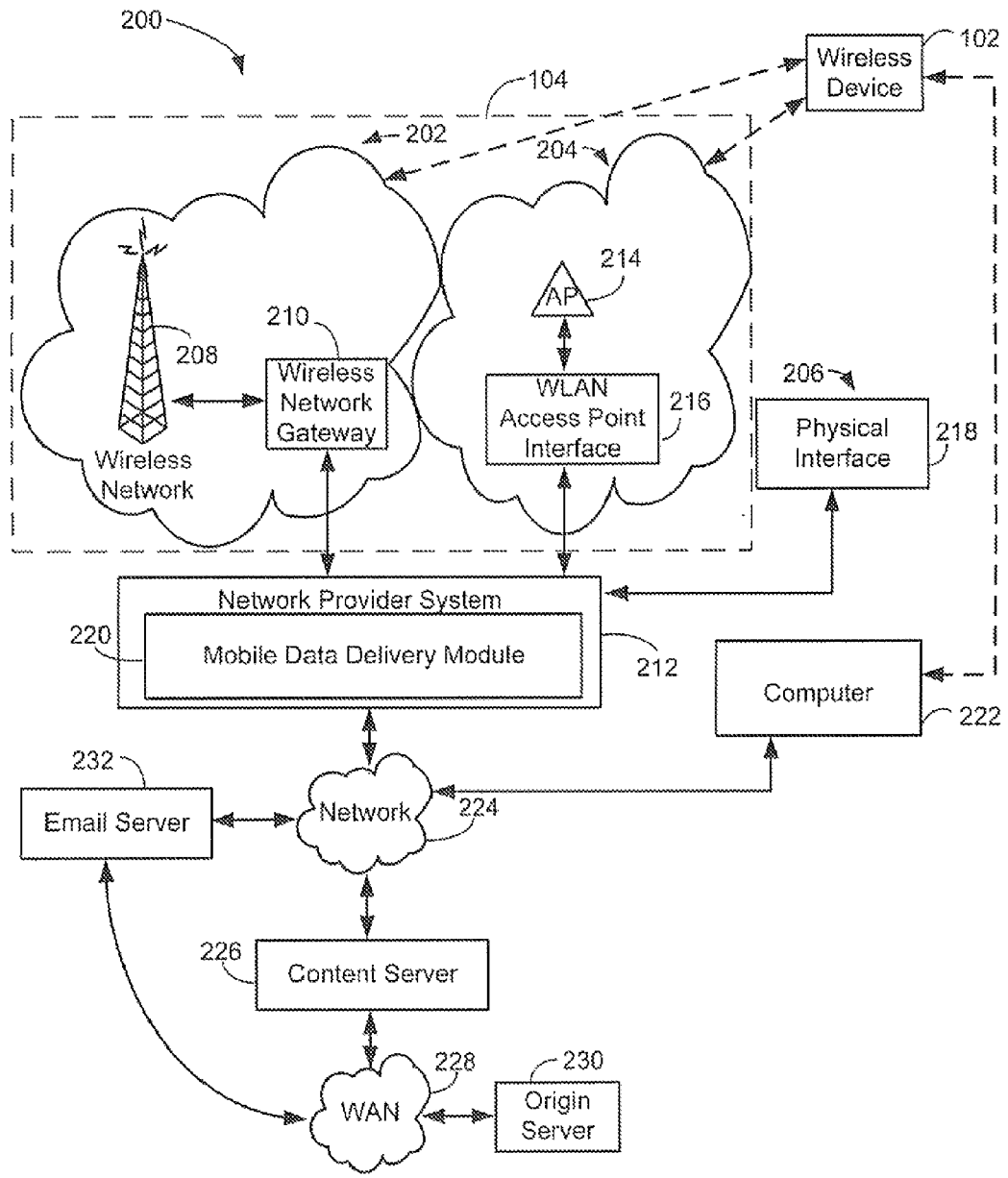
FIG. 2 shows in block diagram form a communication system suitable for providing the operating environment of the wireless device of FIG. 1 in accordance with an embodiment.

FIG. 2 shows a communication system 200 suitable for use with the wireless device 102 shown in FIG. 1. The communication system 200 may include one or more wireless devices 102 (only one of which is shown in FIG. 2) and a wireless network 104, The wireless network 104 may include a wireless Wide Area Network (WAN) 202, a Wireless Local Area Network (WLAN) 204, and/or other interfaces 206 (which are not necessarily wireless).

The wireless WAN 202 may be implemented as a packet-based cellular or mobile network that includes a number of base stations 208 (one of which is shown in FIG. 2) where each of the base stations 208 provides wireless radio frequency (RF) coverage to a corresponding area or cell. The wireless WAN 202 is typically operated by a cellular network service provider that sells subscription packages to users of the wireless devices 102. The wireless WAN 202 comprises a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network) or various other third generation (or higher) networks such as EDGE (Enhanced Data rates for GSM Evolution), UMTS (Universal Mobile Telecommunications Systems), Third Generation Partnership Project (3GPP or 3G), Evolution-Data Optimized (EV-DO), or 4G.

The communications system 200 may also include a wireless network gateway 210 and one or more network provider systems 212. The wireless network gateway 210 provides translation and routing services between the network provider system(s) 212 and the WAN 202, which facilitates communication between the wireless devices 102 and other devices (not shown) connected, directly or indirectly, to the network provider system 212.

The WLAN 204 comprises a network which may conform to IEEE 802.11 standards such as 802.11b, 802.11g, and/or 802.11n; however, other communications protocols may also be used for the WLAN 204. The WLAN 204 includes one or more wireless RF Access Points (AP) 214 (one of which is shown in FIG. 2) that collectively provide a WLAN coverage area. For the embodiment depicted in FIG. 2, the WLAN 204 is operated by an enterprise (for example, a business or university in a building or campus type environment) and the access points 214 are connected to an access point (AP) interface 216. The AP interface 216 provides translation and routing services between the access points 214 and the network provider system 212 to facilitate communication between two or more of the wireless devices 102 and other devices (e.g., such as desktop computers) connected, directly or indirectly, to the network provider system 212. The AP interface 216 is implemented using a computer, for example, a server running a suitable computer program or software.

According to an embodiment, the other interfaces 206 may be implemented using a physical interface indicated by reference 218. The physical interface 218 includes an Ethernet, Universal Serial Bus (USB), Firewire, or infrared OR) connection implemented to exchange information between the network provider system 212 and the wireless device 102.

The network provider system 212 comprises a server or server modules or a number of servers or server modules which are typically located behind a firewall (not shown). The network provider system 212 may include a number of modules including a mobile data delivery module 220. Various modules running on the network provider system 212 may be implemented as a number of services running on a single server or as a number of interconnected servers each running a software program to implement the functionality of the respective module. The network provider system 212 provides access for the wireless devices 102, through either the wireless WAN 202, the WLAN 204, or the other connection 206 to the devices connected, for example, through an enterprise network 224 (e.g., intranet), to the network provider system 212. In an embodiment, the data delivery module 220 may be implemented on a computer, such as the network provider system 212.

The enterprise network 224 may include a local area network, an intranet, the Internet, a direct connection, or combinations thereof. The enterprise network 224 may include an intranet for a corporation or other type of organization. In at least some embodiments, the network provider system 212 is part of the enterprise network 224, and is located behind a corporate firewall and connected to the wireless network gateway 210 through the Internet. A computer 222 (e.g., a desktop or laptop computer) belonging to the user of the wireless device 102 may be connected to the enterprise network 224. As described earlier, the wireless device 102 may be temporarily and directly connected to the computer 222 using, for example, the serial port 152. This direct connection may make use of a cradle or docking station connected to a serial port of the computer 222, where the mobile device 102 is placed in the cradle, therefore completing the serial or other physical connection between the mobile device 102 and the computer 222. Alternatively, the wireless device 102 may communicate with the computer 222 using a non-physical connection such as the communication subsystem 112 and the WAN 202 and/or the short-range communications subsystem 162 and the WLAN 204.

An application/content server 226 may be connected to the enterprise network 224 and also to another network, for example a Wide Area Network (WAN) 228. In some embodiments, an email server 232 and/or the content server 226 form part of the enterprise network 224. The WAN 228 may further connect to other networks. The WAN 228 may comprise or be configured with the Internet, a direct connection, a LAN, a wireless communication link, or any combination thereof. Content providers, such as Web servers, may be connected to the WAN 228, an example of which is shown in FIG. 2 as an origin server 230.

According to an embodiment, the mobile data delivery module 220 provides connectivity between the wireless WAN 202 and the WLAN 204 and the other connection 206 and devices and/or networks connected directly or indirectly to the network provider system 212. In one embodiment, the connectivity provided may be Hypertext Transfer Protocol (HTTP) based connectivity providing an Internet based service connection to devices connected to the wireless WAN 202, the WLAN 204, or the other connection 206 and devices and/or networks connected directly or indirectly to the network provider system 212. The network 224, the application/content server 226, the WAN 228, and the origin server 230, are individually and/or collectively in various combinations a content source for the network provider system 212. The system shown in FIG. 2 includes but one of many examples of a communication network or configuration for use with the wireless devices 102.

Figure 3:
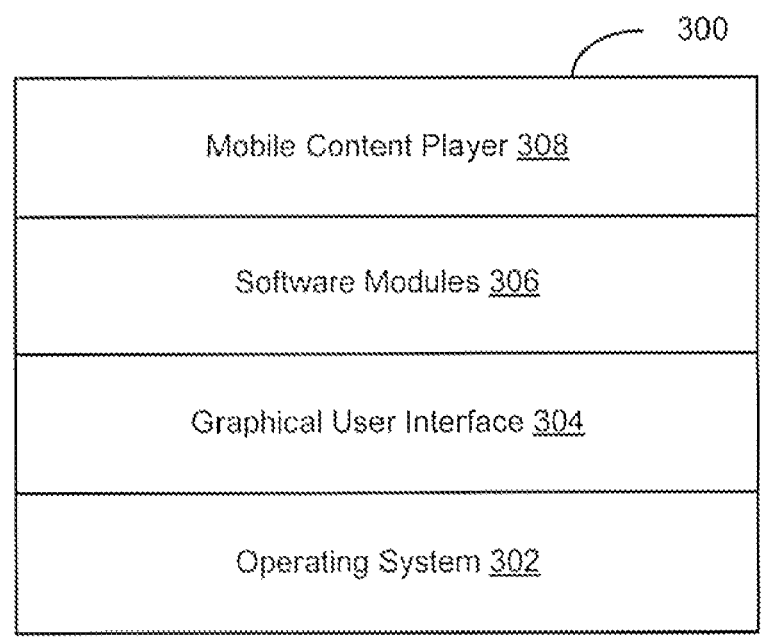
FIG. 3 shows in block diagram form the contents of a memory of the wireless device of FIG. 1.

FIG. 3 shows a block diagram illustrating a memory 300 of the wireless device 102. The memory 300 may include various software components for controlling the wireless device 102 and may include, for example, flash memory 144, RAM 146, ROM 148, memory module 130 and/or the other device subsystems 164. In accordance with an embodiment, the wireless device 102 may be a multi-tasking wireless communications device configured for sending and receiving data items and for making and receiving voice calls that also include various applications enabling users to listen to music, watch video files, play games, view picture files, and surf the internet wirelessly. To provide a user-friendly environment to control the operation of the wireless device 102, an operating system (OS) 302 resident on the wireless device 102 may provide a complex or basic set of operations, as needed, for supporting various applications, which may be operable through a graphical user interface (GUI) 304. For example, the operating system 302 may provide basic input/output system features to obtain input from the auxiliary I/O 150, the keypad 154, the input device 160, and/or other input devices, and to facilitate output to the user, for example, via the display 142. The GUI 304 is typically a component of the operating system 302. One or more software modules 306 for managing communications or providing a personal digital assistant (PDA) or other functions may also be included. The memory 300 may also include an email and calendar client, which may be combined in, for example, a PIM application having email-based calendaring and scheduling functions. Typically, the PIM is installed as one of the software modules 306.

The memory 300 may also include a content player 308, which may also be referred to as a content delivery module, or content management module. In one example, a mobile content player 308 may be integrated into the operating system 302. Alternatively, the module 308 may be a separate software component, as illustrated in FIG. 3. The mobile content player 308 may be responsible for managing push (or pull) content delivery from multiple servers from the perspective of the wireless device 102 and/or playing the content delivered from the multiple servers, or otherwise delivered or stored in the device 102. Other components such as the software modules 306 or operating system 302 may be configured for managing push (or pull) content delivery.

Thus, the wireless device 102 may include computer executable programmed instructions for directing the wireless device 102 to implement various applications. The programmed instructions may be embodied in the one or more software modules 306 resident in the memory 300 of the wireless device 102. Alternatively, the programmed instructions may be tangibly embodied or stored on a computer readable medium (such as a DVD, CD, floppy disk or other storage media) which may be used for transporting the programmed instructions to the memory 300 of the wireless device 102. Alternatively, the programmed instructions may be embedded or carried in a computer-readable, signal-bearing medium that is uploaded to the wireless network 104 by a vendor or supplier of the programmed instructions, and this signal-bearing medium may be downloaded through one or more of the interfaces 112, 150, 152, 162 to the wireless device 102 from, for example, the wireless network 104 by end users.

Figure 4:
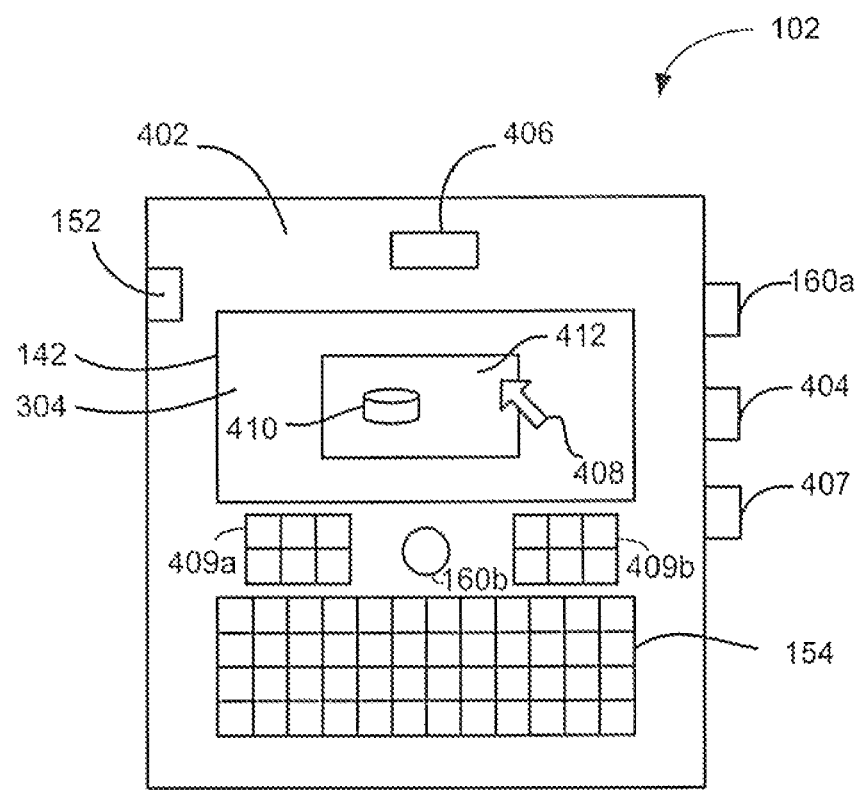
FIG. 4 is a front view illustrating the wireless device of FIG. 1.

FIG. 4 shows a front view of the wireless device 102. As mentioned above, the wireless device 102 may be a data and/or voice-enabled handheld device. The wireless device 102 may include a casing 402, the data or serial port 152, the display screen 142, the graphical user interface (GUI) 304, the keypad 154, the input device (e.g., clickable thumbwheel or scroll buttons) 160*a* or other device for navigation such as a trackball 160*b*, one or more input buttons 404 (e.g., select, cancel, talk, play, stop, fast forward, rewind, next, previous buttons), signal inputs/outputs 406 (e.g., direct wire connection or inductive coupling power connector input, microphone, speaker, data interface input, etc.), and an audio port 407. Additionally, the wireless device 102 may have a number of navigation control buttons represented by numerals 409*a* and 409*b*. The navigation control buttons 409 may provide a number of functions such as a send and/or end key for a mobile telephone application of the wireless device 102, a menu key, an escape key. The functions of the navigation control buttons 409 may be user configurable. Internally, the wireless device 102 may include one or more circuit boards (not shown), the microprocessor 140 (FIG. 1), the memory 300 (FIG. 3), the battery 138 (FIG. 1), and the antennae 118, 120 (FIG. 1), which may all be coupled to the signal inputs/outputs 406, the keypad 154, the display screen 142, the clickable thumbwheel 160.

The microprocessor 140 may be coupled to one or more input devices (e.g., the buttons 404, the keypad 154, the clickable thumbwheel 160*a*, the trackball 160*b*) for receiving user commands or queries and the display 142 for displaying the results of these commands or queries. For example, user queries may be transformed into a combination of commands for producing one or more tables of output data which may be incorporated in one or more display pages for presentation to the user. The microprocessor 140 is also coupled to the memory 300.

A user may interact with the wireless device 102 and its software modules 306 using the GUI 304. The GUI 304 is controlled by the operating system 302 (FIG. 3) and provides a display format enabling the user to choose commands, execute application programs, manage computer files, and perform other functions by selecting pictorial representations (i.e., icons), or selecting items from a menu through the use of an input or pointing device such as the clickable thumbwheel 160 and/or the keypad 154. Generally, the GUI 304 is used to convey information and receive commands from users and generally includes a variety of GUI objects or controls including icons, toolbars, drop-down menus, pop-up menus, text, dialog boxes, buttons, etc. A user typically interacts with the GUI 304 presented on the display 142 by using an input or pointing device to position a pointer or cursor 408 over an object 410 (i.e., "pointing" at the object) and by "clicking" on the object 410 (e.g., by depressing the thumbwheel 160 or a button on the keyboard 154, etc.). This is often referred to as a point-and-click or selection operation. Typically, the object 410 may be highlighted (e.g., shaded) when it is selected or pointed at by the pointer or cursor 408 to indicate that the object 410 is selectable.

Typically, a GUI-based system presents application, status, and other information to the user in windows appearing on the display 142. A window 412 is a display area shown within the display 142, typically rectangular, in which a user may view an application or document. The window 412 may be open, closed, displayed full screen, reduced to an icon, increased or reduced in size, or moved to different areas of the display 142. Multiple windows 412 may be displayed simultaneously. For example, the windows 412 may be displayed within other windows, overlapped with other windows, or tiled within the display area.

Figure 5:
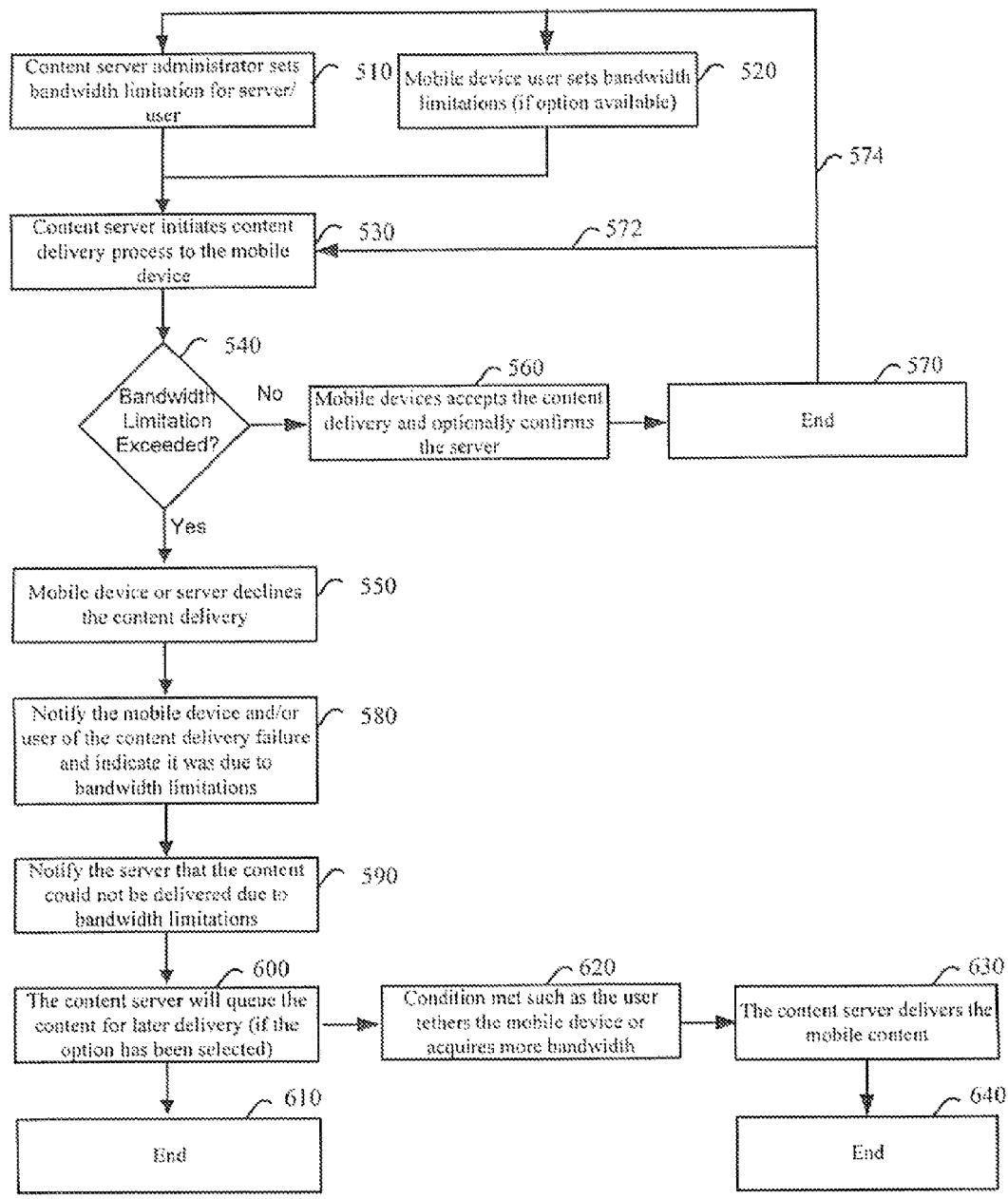
FIG. 5 shows a block diagram illustrating aspects of a method for enabling bandwidth management for mobile content delivery in accordance with an embodiment.

FIG. 5 shows in flow chart form, a method of effectively managing the content provided by communication network 104 to mobile device 102. The method may be employed to limit the bandwidth usage of mobile device 102 within a specific timeframe or based on some other criterion or criteria. The method may be used in conjunction with either push or pull content delivery.

Beginning at block 510, a content server administrator of a content provider may set a bandwidth usage policy or content delivery policy for the content server host, such as content server 226. A policy may be set at some other source including network 224, WAN 228, origin server 230, email server 232, or even by an internet service provider (ISP). This policy may be set for an individual user, individual (or all) users within that host, a group of users (however defined, e.g., sales staff, group, club, division, team, company, or subsidiary), or some other individual or group receiving content. Alternatively, a bandwidth usage policy may be deactivated or selectively employed for such users or set as a default for users of one or more content servers.

The policy may be set depending upon the delivery method used to distribute content. Transmission using delivery methods such as carrier, non-carrier (e.g., WiFi), tethered or roaming may be affected by the policy. For example, the policy set fir transmission of content while the user is roaming (e.g., beyond the range of the user's service provider) may be set more restrictively (for reasons such as cost), than for transmission via a tethered connection, which may have a less restrictive (or no) policy set. Users may be permitted to only receive content when one or a subset of content delivery methods are used. For example, a policy may be set so that content is only delivered to a user when a non-carrier or tethered content delivery method is accessed by the mobile device. Policies may also be set regardless of the delivery medium.

The bandwidth policy may include a maximum amount of bandwidth available to a user or group. For example, a user or group may be provided with a data transfer limit within a selected regular or irregular timeframe (e.g., hourly, daily, weekly, monthly, during peak usage times, or depending upon real time or predicted bandwidth availability). Limits may be set based on a fixed number such as: no more than X bytes of data in a month may be transferred. The actual limit may be any suitable data limit, such as business motivated limits (e.g., to maintain capacity in the network, or to manage data transmission costs). The bandwidth limit may also be dynamic and fluctuate in accordance with one or more criteria, such as the daily or expected cost of bandwidth per unit of data.

"Low cost" and "high cost" are relative terms which depend upon context. For example, transmission of relatively small content after bandwidth limits have been reached may be considered high cost. Conversely, transmission of relatively large content over a tethered connection may be considered low cost, even if bandwidth limits have been reached. The description of cost is therefore flat limited to strictly defined modes of transmission or content size.

In block 520, a mobile device user who has been granted the rights to change the policy for him or herself, and/or other users (or group of users) may additionally, or alternatively, be permitted to set a more restrictive bandwidth policy for receiving content to their mobile devices. The bandwidth policy can identify the limits on bandwidth usage. The policy may also indicate whether it pertains to purely wireless usage and/or if the policy also pertains to non-carrier wireless usage, such as WiFi, and/or other types of connections such as tethered connections. Tethered connections may include connections where the mobile device is physically connected (e.g., by serial cable) to a personal computer (e.g., the personal computer 222 of FIG. 2) or other device, which in turn is connected to the Internet, network or other content source. The policy may also apply to content delivery while roaming, for example, on other networks (which may include higher usage fees). The policy may be set to reduce or minimize costs associated with data transmission.

As noted, the bandwidth limits may be predetermined as static (e.g., X bytes) or dynamic (e.g., when bandwidth is scarce or unavailable, when data transmission costs are above $X per unit of data).

Policy criteria may be applied to an individual user or across a group of users. For example, if the total bandwidth is pooled and shared by a group of users, and the bandwidth used exceeds X, then transmission is reduced or stopped for all users. Hence, a user in a group who uses no bandwidth may be prevented from downloading content because other users in the group may have collectively reached the maximum.

The size of content to be delivered may also be used to determine the set policy. For example, the policy for the transmission of content of a given size (or type) may be set restrictively for larger content (e.g., the policy may prevent delivery when the mobile device is roaming), and less restrictively for smaller content (e.g., unlimited delivery when the mobile device is tethered).

Once the policy is set, content may be delivered to a user in block 530. When content is delivered to the mobile device 102 from the content, provider server 226, the mobile content player 308 (or other component of mobile device 102, such as the operating system 302) may be configured to compare the current bandwidth used within the timeframe to the limitation set in the policy. Alternatively (or additionally), the content server 226 may be configured to compare the current bandwidth used within the timeframe to the limitation set on the policy. Policies may be available to or communicated to the user.

Multiple policies may also apply. For example, a more permissive transmission policy may apply before a first bandwidth limit has been reached (e.g., transmission of content is permitted regardless of transmission medium), and another policy may apply beyond a second bandwidth limit (e.g., transmission via tethered connection only). Additional policies may apply for different bandwidth levels and/or content types.

The comparison to determine if a policy has been satisfied may be carried out in block 540. If the mobile content player 308 has already received content equal to or greater than the amount set in the policy, then the player declines to receive further content in block 550 (and/or the server 226 stops transmitting content). Mobile content player 308 may be configured to communicate to the content provider that the user has exceeded the specified download or bandwidth limit. In the case where server 226 manages the transmission, it may be configured to communicate to the content provider that the user has exceeded the specified download or bandwidth limit.

If the mobile content player has not reached the limit, then the content is delivered in block 560. While assessment may end at block 570, the assessment of content delivery and compliance with a policy may be iterative, and processing may continue at block 530 via path 572 for additional content. Alternatively, the policy set by the administrator in block 510 or user in block 520 may be iteratively assessed for any changes, via path 574, before proceeding to additional content delivery in block 530.

Content player 308 may also be configured to communicate warnings (e.g., via email or notifications displayed via. GUI 304) to the user (or other party such as the system administrator) as the download or bandwidth limit is being reached.

In block 580, if the content is not accepted (or delivered) due to bandwidth limitations, then the user and/or other party) (such as the system administrator) is notified that the content cannot be delivered due to having met or exceeded the bandwidth limits (or otherwise violating the policy).

In block 590, the server 226 may be notified that content was not delivered due to bandwidth limits.

If the content server 226 is notified that the mobile content could not be delivered due to bandwidth limitations (block 590), or some other reason such as the device memory is full, then the content server may be configured in two ways. The content server 226 may be configured to either (1) keep the content in the delivery queue (block 600), to wait until the mobile content user (or in an embodiment some other designated or authorized party) can receive or retrieve the content, or (2) the content server can be configured to remove, transfer or delete the content from the queue. One or more of these options may be selected by the content server administrator (and/or other suitable party, such as the end user). If the content is not retrieved, then processing may end in block 610. Alternatively, processing of additional content may continue from one or more of blocks 550, 580, 590 or 600 in a manner similar to that shown following block 570 (not shown; see paths 572 and 574 in FIG. 5).

In block 620, if the content has been declined in block 550 due to bandwidth limitations or for not satisfying a policy condition, then the content server administrator (or user, depending upon configuration) may enable an option that allows the user to retrieve the queued content when the user satisfies one or more of the following conditions:

The present bandwidth period expires, and a new bandwidth period starts, in which case more bandwidth becomes available;

The mobile device 102 connects (either automatically or manually) to a non-carrier wireless network such as a WiFi network (e.g., the WLAN 204); or The mobile device 102 is tethered to a network, such as a personal computer 222 connected to the internet.

Other suitable criteria or conditions may be employed. Criteria also may be used in combination with those listed above. For example, the policy may limit or prevent content delivery when the mobile device 102 operates on a third party network (e.g., while roaming), or if the mobile device 102 is operated in a certain jurisdiction (e.g., Mexico).

In block 630, if one or more of these conditions are met, the user may view the queued content on the content server (if this option is available) and select the content that they would like to have delivered. Alternatively, the content may be automatically provided to the user upon the condition being met. The remaining content is removed from the delivery queue.

Processing may end in block 640. Alternatively, processing of additional content may continue in a manner similar to that shown following block 570 (not shown; see paths 572 and 574 in FIG. 5).

If pooling of bandwidth is employed, then the central content server 226 may calculate the collective amount of remaining bandwidth available. When a content package is requested for download to a mobile content player 308 (or a specific wireless device 102), then the central content server 226 may determine the maximum allotted bandwidth for the wireless device 102 and communicate this allotment to the mobile device 102. The maximum allotted bandwidth may be determined by a formula based off of the size of the requested content package and allowing for a predetermined number of retries or errors.

Once the mobile content player 308 has completed receiving the content package, then the central content server 226 may be notified, for example with a completion message, of the actual usage of allotted bandwidth. The actual usage may then be used to calculate total remaining bandwidth available.

If the mobile content player 308 reaches a limit for the bandwidth allotted for that content package, the player 308 may then send a request to the central content server 226 requesting additional bandwidth for the content package. If additional bandwidth is available from the pool, then the central content server 226 may send a new maximum bandwidth allotment to the mobile content player 308 using a formula based on the size of the remaining content package data. If the requested content package exceeds the total available using the pooling of bandwidth then central content server 226 will notify the mobile content player 308 that the bandwidth has been exceeded.

As noted above, other components such as software modules 306 or operating system 302 may perform the management functions described herein for player 308.

The system and method described may be employed when a content server administrator and/or a user want to limit data usage. The system and method may be used by a mobile content player 308 to manage (or limit) the bandwidth of delivered mobile content from content providers. For example, the amount of monthly bandwidth that is available may be restricted for the mobile content player 308 to receive delivered content to ensure that a monthly data plan is not exceeded. Similarly, the amount of content from training systems (or content publishers) where courses are delivered to mobile users or groups, may be managed using the disclosed system and method. For training systems, the content publishers may include compliance content providers, internal company training materials, or external content publishers. Intermittent or regular video or audio messages from company personnel, such as a chief executive officer, may be effectively pushed (or pulled) a mobile device by employing appropriate policies as described herein. Policies may also be employed to limit the amount of content delivered from news readers through RSS feeds delivered from content publishers, or to limit the amount of delivered video and audio files from content publishers, such as a news site.

The source of the content may also be used to set policies for transmission. For example, certain publishers, servers, or web sites may be used to set transmission limits in conjunction with, or independently of, the criteria described above.

The foregoing concepts generalize to the management of content delivery from a server to a mobile device in a multitude of contexts for nearly any type of content that may be transmitted.

Ring Tones

There may also be provided a method for enabling the customization of ring tones which may be determined by the type and category of content received.

Delivery of content such as graphics, audio and video to mobile devices and the audible notifications (e.g. a Ringtone on a Blackberry™ device) emitted upon receipt of the content.

The disclosed method permits a mobile device user or content publisher to specify different ringtones for the receipt of different content. The ringtones can be set for each:
  Type of content
  Source of content
  Category of content
  Priority of content
This may allow improvements such as:
  The mobile device user or content publisher can configure their mobile content player to play a specific ringtone to notify the mobile device user that mobile content has been received.
  The mobile device user or content publisher can configure their mobile content player to select a ringtone to notify the mobile device user for each type/source/category/priority of mobile content.
  The mobile content author/publisher can determine the priority and category of items to trigger the different ringtone for those mobile device users that have it configured.
  A content provider can select a default ringtone for each type/source/category/priority of mobile content.
  The default ringtone may be used by the mobile content player to notify the mobile device user of delivered content. If the mobile device user has been provided the option, then they may customize the ringtones on their mobile device that will supersede the default ring tones, This option may be disabled by the content server administrator.
  Upon receipt of the mobile content delivered by the content provider, the mobile device will emit a custom audible notification (e.g. the ringtone) that is associated to the specific:
  Type of content
  Source of content
  Category of content
  Priority of content
  that has been received based on the mobile device user selected or default ringtones. The ringtone will be delivered with the content from the content publisher if the ringtone is not already available on the mobile device.

Applications of this Technology

This technology can be used by a mobile content player to differentiate mobile content that is delivered to it and notify the user appropriately. This allows the mobile device user to determine ringtone notifications for differing mobile content type/source/category/priority. Practical applications of this invention include:
  Training systems where courses are delivered to mobile device users and groups from multiple content publishers. For training systems the content publishers can indicate higher priority content as well as the mobile content category.
  News readers through RSS feeds will allow the mobile device user to configure ringtones to identify which feeds have updated content (e.g. the sound of cars going by on a track for racing news, or the crack of a bat for baseball sports news)
  Receiving video and audio files from multiple content publishers, such as any news site. The mobile device user will be able to determine which site, which type of content as well as the category of the content (i.e. political news, business news, etc. from CNN, Reuters, etc.)
  Any content delivered to the mobile content player can be audibly identified based on the user's or content provider's configuration of ringtones without having to physically check their mobile device.

Disabling Player

There may also be provided a method for disabling a mobile content player while a mobile device is in motion. Content such as graphics, audio and video may be delivered to mobile devices for a mobile content player while the mobile device is in motion.

There is provided a method for a mobile content player to determine the speed at which the mobile device is travelling and to disable the mobile content player if the user is moving faster than predetermined speed. This is intended as a safety feature to prevent distraction while operating a vehicle that is in motion.

The mobile content player uses the GPS within the mobile device to detect the rate of movement as a formula of distance over time. If the mobile device is exceeding a pre-set rate of movement, then the mobile content player will provide the user with a warning indicating that it is unsafe to operate the mobile content player while operating a moving vehicle. The content server administrator creates the policy including the settings and can allow the mobile device user to disable this feature or make the settings more restrictive.

This feature may be configured to either provide a warning or to disable the mobile content player. The mobile content player uses the GPS functionality that is built into the mobile device to determine the rate of movement of the mobile device. This determination is accomplished by polling the GPS function at a preset interval and calculating the current location with the previous location. This information will then be used in a formula to determine the distance traveled within that time frame and therefore the relative rate of movement. This feature allows the content server administrator to create a policy with the following settings for one or more mobile devices.

The content server administrator can configure the rate of movement that will trigger this invention. The content server administrator may also configure the mobile content player to either provide a warning to the user, either audible, visual or through some other mechanism, or to disable the mobile content player.

The content server administrator may configure the mobile content player to provide a warning regarding operation of the mobile device once a pre-set rate of movement has been exceeded and then to disable the mobile content player once a preset, faster rate of movement has been exceeded.

The content server administrator may set the policy to allow the user to either override the policy settings or to change the policy settings to be more restrictive, but not less.

Applications of this Technology

This technology may be used by a mobile content player to help a user reduce distractions while in motion. Applications of this invention include:

- The mobile content player warns the user of the possibility of distraction when travelling faster than a pre-set rate of movement.
- The mobile content player automatically disables itself once the mobile device is travelling faster than a pre-set rate of movement.
- Commercial vehicle operators may receive important updates while en route and there would be a safety issue with the reading the content while operating the vehicle (i.e. Truck Drivers receiving delivery updates, Mail Carriers receiving route update information, Taxi Drivers)

While the foregoing embodiments of the invention(s) have been described in some detail for purposes of clarity and understanding, it will be appreciated by one skilled in the art, that numerous modifications, variations, and adaptations may be made to the particular embodiments of the invention described above without departing from the scope of the invention, which is defined in the following claims.

What is claimed is:

1. A system for content delivery from a content server to a client device, the system comprising:
   a processor configured to execute computer-executable instructions to cause the processor to:
      select a mode of transmission for delivering the content to the client device by evaluating a current bandwidth usage according to a predefined policy;
      the predefined policy being defined to:
         cause selection of a first mode of transmission when the current bandwidth usage is within a predefined bandwidth usage threshold; and
         cause selection of a second mode of transmission when the current bandwidth usage is outside of the predefined bandwidth usage threshold; and
      deliver content using the selected mode of transmission,
      wherein the first mode of transmission comprises one of a carrier mode of transmission, roaming mode of transmission, non-carrier mode of transmission, and a tethered mode of transmission;
      wherein the second mode of transmission comprises one of a carrier mode of transmission, roaming mode of transmission, non-carrier mode of transmission, and a tethered mode of transmission; and
      wherein the second mode of transmission is different than the first mode of transmission.

2. The system of claim 1, wherein the first mode of transmission has a higher cost of transmission than the second mode of transmission when the current bandwidth usage is outside of the predefined bandwidth usage threshold.

3. The system of claim 1, wherein the policy is for pooled bandwidth and the client device is part of a bandwidth pool, and wherein, when the current bandwidth usage of the client device is outside of the predefined bandwidth usage threshold, the computer-executable instructions further cause the processor to:
   evaluate the current bandwidth usage based on a pooled bandwidth usage threshold in place of the predefined bandwidth usage threshold when additional bandwidth is available from the bandwidth pool.

4. The system of claim 3 wherein the pooled bandwidth usage threshold is based on a size of a remaining content data to be delivered to the client device.

5. The system of claim 1, wherein the predefined policy is further defined to cause selection of the first or the second mode of transmission based on at least one of: bandwidth available, bandwidth cost, type of the content to be transmitted, size of the content to be transmitted, and available modes of transmission.

6. The system of claim 1, wherein the content server is a push content server for pushing content to the client device.

7. The system of claim 1, wherein when the selected mode of transmission is not available, the computer executable instructions further cause the processor to:
   queue the content for delivery; and
   deliver the content using the selected mode of transmission when the selected mode of transmission is available.

8. The system of claim 1, wherein the selected mode of transmission is the second mode of transmission, and wherein the computer executable instructions further cause the processor to:
   when the second mode of transmission is not available, and when the current bandwidth usage has dropped below the predetermined bandwidth usage threshold, select the first mode of transmission for delivering the content.

9. A method for content delivery from a content server to a client device, the method comprising:
- selecting a mode of transmission for delivering the content to the client device by evaluating a current bandwidth usage according to a predefined policy;
- the predefined policy being defined to:
    - cause selection of a first mode of transmission when the current bandwidth usage is within a predefined bandwidth usage threshold; and
    - cause selection of a second mode of transmission when the current bandwidth usage is outside of the predefined bandwidth usage threshold; and
- delivering content using the selected mode of transmission,
- wherein the first mode of transmission comprises one of a carrier mode of transmission, roaming mode of transmission, non-carrier mode of transmission, and a tethered mode of transmission;
- wherein the second mode of transmission comprises one of a carrier mode of transmission, roaming mode of transmission, non-carrier mode of transmission, and a tethered mode of transmission; and
- wherein the second mode of transmission is different than the first mode of transmission.

10. The method of claim 9, wherein the first mode of transmission has a higher cost of transmission than the second mode of transmission when the current bandwidth usage is outside of the predefined bandwidth usage threshold.

11. The method of claim 9, wherein the policy is for pooled bandwidth and the client device is part of a bandwidth pool, further comprising, when the current bandwidth usage of the client device is outside of the predefined bandwidth usage threshold:
- evaluating the current bandwidth usage based on a pooled bandwidth usage threshold in place of the predefined bandwidth usage threshold when additional bandwidth is available from the bandwidth pool.

12. The method of claim 11 wherein the pooled bandwidth usage threshold is based on a size of a remaining content data to be delivered to the client device.

13. The method of claim 9, wherein the predefined policy is further defined to cause selection of the first or the second mode of transmission based on at least one of: bandwidth available, bandwidth cost, type of the content to be transmitted, size of the content to be transmitted, and available modes of transmission.

14. The method of claim 9, wherein the delivering is performed by the content server.

15. The method of claim 14, further comprising:
- when the selected mode of transmission is not available, queuing the content for delivery; and
- delivering the content using the selected mode of transmission when the selected mode of transmission is available.

16. The method of claim 9, wherein the delivering is performed by the client device.

17. The method of claim 9, wherein the selected mode of transmission is the second mode of transmission, further comprising:
- when the second mode of transmission is not available, and when the current bandwidth usage has dropped below the predetermined bandwidth usage threshold, selected the first mode of transmission for delivering the content.

* * * * *